US012267650B2

(12) United States Patent
Wang et al.

(10) Patent No.: US 12,267,650 B2
(45) Date of Patent: Apr. 1, 2025

(54) MEMS MICROPHONE

(71) Applicant: AAC ACOUSTIC TECHNOLOGIES (SHENZHEN) CO., LTD., Shenzhen (CN)

(72) Inventors: Linlin Wang, Shenzhen (CN); Rui Zhang, Shenzhen (CN); Kaijie Wang, Shenzhen (CN); Zhuanzhuan Zhao, Shenzhen (CN); Minh Ngoc Nguyen, Bac Ninh (VN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 203 days.

(21) Appl. No.: 18/091,346

(22) Filed: Dec. 29, 2022

(65) Prior Publication Data

US 2024/0080632 A1 Mar. 7, 2024

Related U.S. Application Data

(63) Continuation of application No. PCT/CN2022/125144, filed on Oct. 13, 2022.

(30) Foreign Application Priority Data

Sep. 2, 2022 (CN) ......................... 202222343985.0

(51) Int. Cl.
*H04R 19/04* (2006.01)
*H04R 7/14* (2006.01)

(52) U.S. Cl.
CPC ............... *H04R 19/04* (2013.01); *H04R 7/14* (2013.01); *H04R 2201/003* (2013.01)

(58) Field of Classification Search
None
See application file for complete search history.

(56) References Cited

U.S. PATENT DOCUMENTS

| | | | | |
|---|---|---|---|---|
| 8,121,315 | B2 * | 2/2012 | Song | H04R 19/04 381/174 |
| 8,436,435 | B2 * | 5/2013 | Chan | H04R 19/04 257/419 |
| 9,580,299 | B2 * | 2/2017 | Dehe | B81C 1/00158 |
| 11,943,584 | B2 * | 3/2024 | Chen | B81B 3/001 |
| 12,096,183 | B2 * | 9/2024 | Chen | H04R 19/04 |
| 2022/0396469 | A1 * | 12/2022 | Chen | H04R 7/06 |

* cited by examiner

*Primary Examiner* — Paul W Huber
(74) *Attorney, Agent, or Firm* — W&G Law Group

(57) ABSTRACT

A MEMS microphone, includes a substrate with a back cavity, and a capacitive system located on the substrate, including a back plate and a diaphragm opposite to the back plate, wherein the back plate includes a body portion, a fixing portion connected with the body portion and the substrate, and a plurality of strip reinforcing ribs, the reinforcing ribs are protruded from the body portion. Compared with the related art, the MEMS microphone disclosed by the present disclosure could improve the strength of the back plate.

9 Claims, 3 Drawing Sheets

MEMS MICROPHONE

TECHNICAL FIELD

The present disclosure relates to a field of sound-electric conversion technology, in particular to a micro-electro-mechanical system (MEMS) microphone.

BACKGROUND

With rapid development of the mobile communication technology in recent years, mobile communication devices such as portable phones, portable phones capable of accessing Internet, personal digital assistants and other devices that perform communication specially utilizing communication networks are used more and more. A microphone, especially a MEMS microphone, is one of the most important units used in the above-described devices.

A micro-electro-mechanical system (MEMS) microphone is an electroacoustic transducer produced by micro-mechanical technology, with small volume, excellent frequency response characteristic, low noise and the like. As electronic devices are getting miniaturized, lightened and thinned, MEMS microphones are increasingly widely used in those devices.

The MEMS microphone in the related art includes a substrate with a back cavity and a capacitor system arranged on the substrate, the capacitor system includes a back plate and a diaphragm arranged opposite to the back plate. The strength of the back plate is important to the reliability of the MEMS microphone. In addition, the back plate is provided with several through-holes, which will further reduce the strength of the back plate and thus affect the reliability of the product.

Thus, it is necessary to provide a MEMS microphone to solve the problem.

SUMMARY

In view of the above, an objective of the present disclosure is to provide a MEMS microphone with high strength of the back plate.

In order to achieve the objective mentioned above, the present disclosure discloses a MEMS microphone, including: a substrate with a back cavity, and a capacitive system located on the substrate, including a back plate and a diaphragm opposite to the back plate, wherein the back plate includes a body portion, a fixing portion connected with the body portion and the substrate, and a plurality of strip reinforcing ribs, the reinforcing ribs are protruded from the body portion.

As an improvement, each of the reinforcing ribs is connected with two edges of the body portion, the two edges are opposite to each other.

As an improvement, at least one of the reinforcing ribs passes through a center of the back plate.

As an improvement, the reinforcing ribs are provided in a centrally symmetrical manner along the center of the back plate.

As an improvement, the reinforcing ribs extend along a radial direction of the body portion.

As an improvement, the reinforcing ribs include a plurality of parallel spaced horizontal reinforcing ribs and a plurality of parallel spaced vertical reinforcing ribs perpendicular to the horizontal reinforcing ribs.

As an improvement, the back plate further includes a connecting block located at a connection of the fixing portion and the body portion, the connecting block is connected with the fixing portion and the body portion respectively.

As an improvement, the fixing portion and the body portion are perpendicular, and the connecting block is wedge-shaped.

As an improvement, the reinforcing ribs are located at a side of the body portion close to the substrate.

As an improvement, the back plate includes a plurality of through holes through the body portion.

DESCRIPTION OF EMBODIMENTS

The technical solutions in embodiments of the present disclosure will be described clearly and completely below with reference to the accompanying drawings in the embodiments of the present disclosure.

First Embodiment

Figure 1:
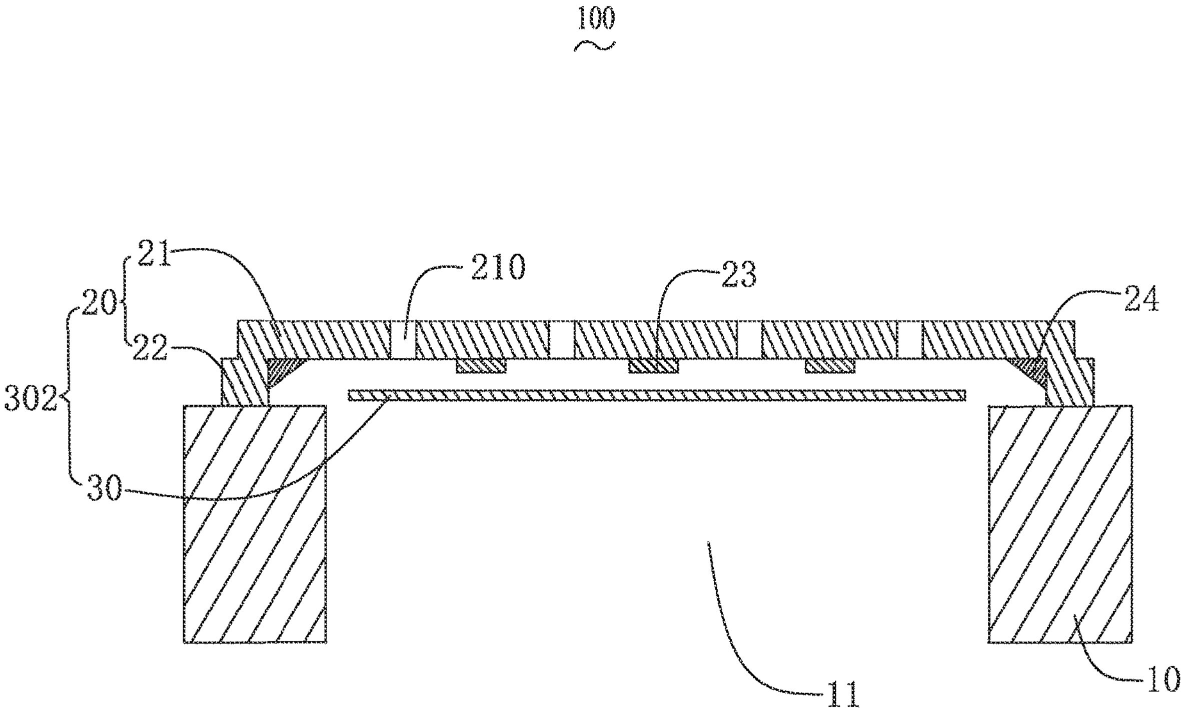
FIG. 1 is a cross-sectional view of the MEMS microphone in accordance with the first embodiment.
Figure 2:
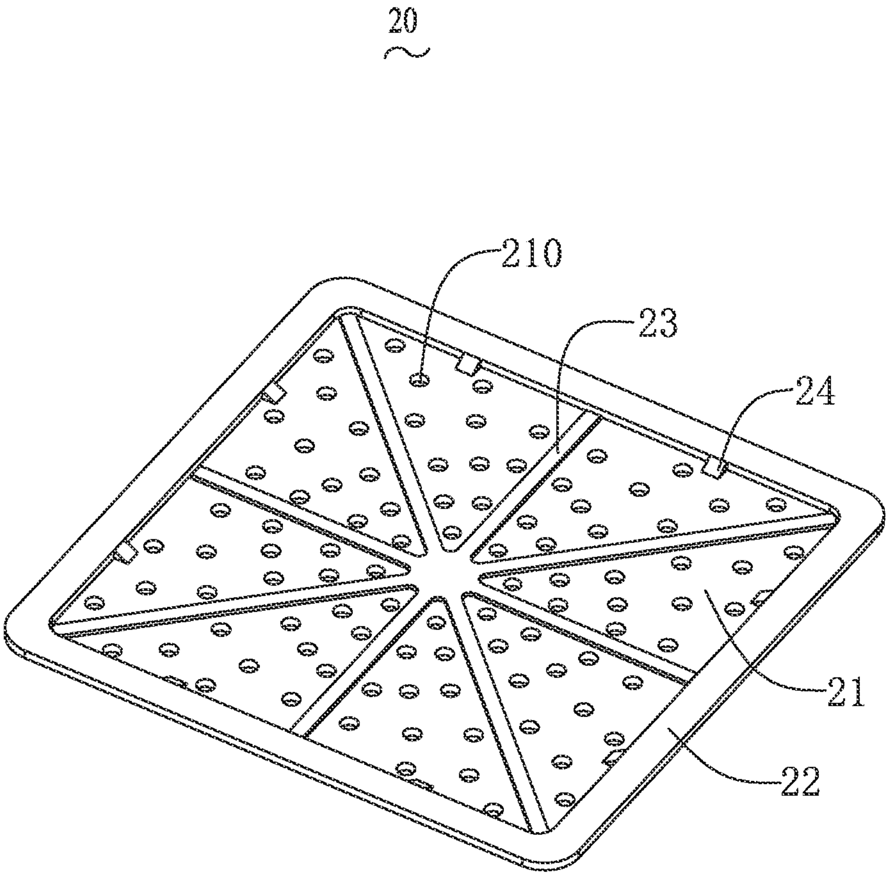
FIG. 2 is a back plate of the MEMS microphone in accordance with the first embodiment.

As shown in FIGS. 1-2, the present disclosure discloses a MEMS microphone 100 including a substrate 10 with a back cavity 11 and a capacitive system 302 arranged on the substrate 10. The capacitive system 302 includes a back plate 20 and a diaphragm 30 opposite to the back plate 20, the diaphragm 30 is located on a side of the back plate 20 close to the substrate 10. When the sound pressure acts on the diaphragm 30, there is a pressure difference between the two sides of the diaphragm 30 facing the back plate 20 and the diaphragm 30 away from the back plate 20, so that the diaphragm 30 moves closer to the back plate 20 or away from the back plate 20, thereby causing the diaphragm 30 to move, the change of the capacitance with the back plate 20 realizes the conversion of the sound signal to the electrical signal.

The back plate 20 includes a body portion 21 and a fixing portion 22 connected with the body portion 21 and the substrate 10. In the present disclosure, the back plate 20 further includes a plurality of strip reinforcing ribs 23, the reinforcing ribs 23 are protruded from the body portion 21, the reinforcing ribs 23 could enhance a strength of the back plate 20 and improve the reliability of the MEMS microphone 100. Each of the reinforcing ribs 23 is connected with two edges of the body portion 21, the two edges are opposite to each other, that is, the reinforcing ribs 23 run through the entire back plate 20, and ends of the reinforcing ribs 23 are extended to two opposite edges of the body portion 21 respectively. In addition, at least one reinforcing rib 23 passes through the center of the back plate 20, thereby enhancing the strength of the center of the back plate 20.

The reinforcing ribs 23 are extended along a radial direction of the back plate 20, that is, all of the reinforcing ribs 23 pass through the center of the back plate 20, and the reinforcing ribs are centrally symmetrical along the center of the back plate 20.

The back plate 20 further includes a connecting block 24 located at a connection of the fixing portion 22 and the body portion 21, the connecting block 24 is located at a side of the back plate 20 close to the substrate 10, and the connecting block 24 is connected with the fixing portion 22 and the body portion 21. The connecting block 24 is stuck between the fixing portion 22 and the body portion 21, which can further strength the back plate 20. The fixing portion 22 and the body portion 21 are perpendicular, and the connecting block 24 is wedge-shaped.

Second Embodiment

Figure 3:
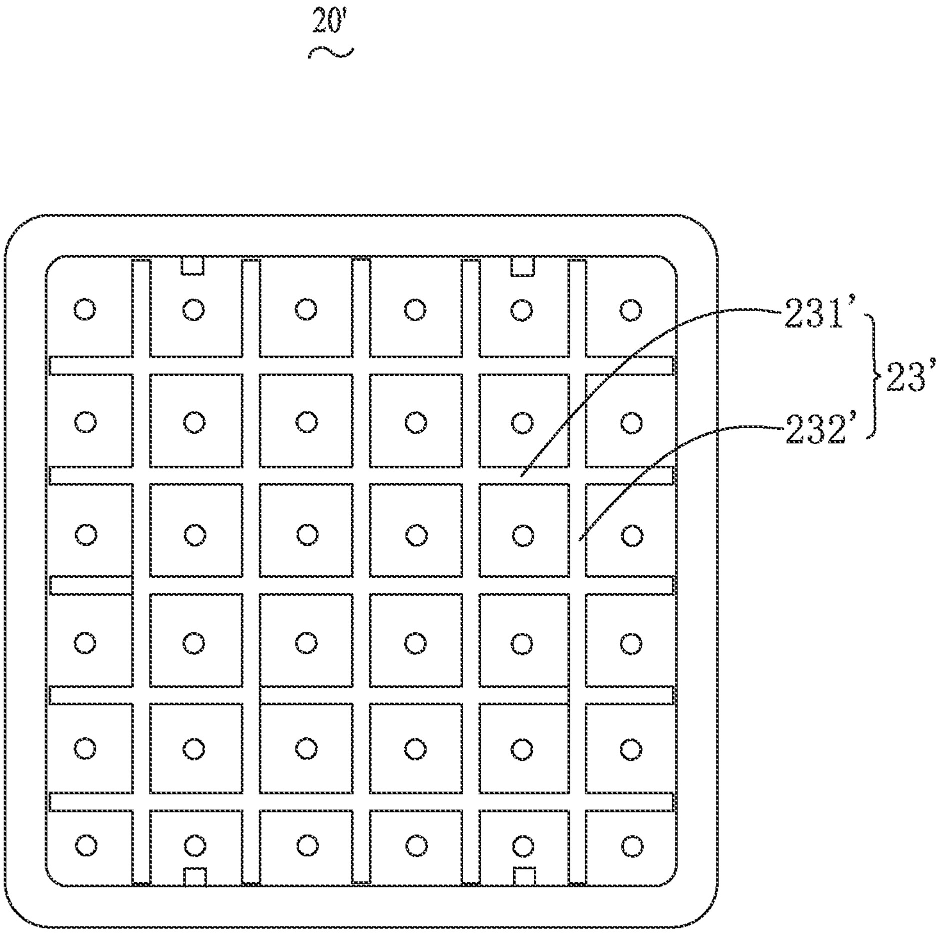
FIG. 3 is a back plate of the MEMS microphone in accordance with a second embodiment.

Referring to FIG. 3, a MEMS microphone 20' is provided by the second embodiment. The distinction between the second embodiment and the first embodiment is that, the reinforcing ribs 23' are arranged in different ways. In the second embodiment, the reinforcing ribs 23' include a plurality of parallel spaced horizontal reinforcing ribs 231' and a plurality of parallel spaced vertical reinforcing ribs 232' perpendicular to the horizontal reinforcing ribs.

Compared with the related art, since the back plate is provided with several reinforcing ribs, which can strengthen the back plate and improve the performance of the MEMS microphone.

The above descriptions are merely some of the embodiments of the present disclosure. It should be pointed out that for those of ordinary skill in the art, improvements can be made without departing from the inventive concept of the present disclosure, shall fall within the scope of the present disclosure.

What is claimed is:

1. A MEMS microphone, comprising:

a substrate with a back cavity, and a capacitive system located on the substrate, comprising a back plate and a diaphragm opposite to the back plate, wherein the back plate comprises a body portion, a fixing portion connected with the body portion and the substrate, and a plurality of strip reinforcing ribs, the reinforcing ribs are protruded from the body portion, each of the reinforcing ribs is connected with two edges of the body portion, the two edges are opposite to each other.

2. The MEMS microphone described as claim 1, wherein at least one of the reinforcing ribs passes through a center of the back plate.

3. The MEMS microphone described as claim 2, wherein the reinforcing ribs are provided in a centrally symmetrical manner along the center of the back plate.

4. The MEMS microphone described as claim 3, wherein the reinforcing ribs extend along a radial direction of the body portion.

5. The MEMS microphone described as claim 3, wherein the reinforcing ribs comprise a plurality of parallel spaced horizontal reinforcing ribs and a plurality of parallel spaced vertical reinforcing ribs perpendicular to the horizontal reinforcing ribs.

6. The MEMS microphone described as claim 1, wherein the back plate further comprises a connecting block located at a connection of the fixing portion and the body portion, the connecting block is connected with the fixing portion and the body portion respectively.

7. The MEMS microphone described as claim 6, wherein an extension direction of the fixing portion is perpendicular to an extension direction of the body portion, and the connecting block is wedge-shaped.

8. The MEMS microphone described as claim 6, wherein the reinforcing ribs are located at a side of the body portion close to the substrate.

9. The MEMS microphone described as claim 6, wherein the back plate comprises a plurality of through holes through the body portion.

* * * * *